(12) United States Patent
Kroese et al.

(10) Patent No.: US 7,677,015 B2
(45) Date of Patent: Mar. 16, 2010

(54) METHOD AND APPARATUS FOR FORMING FILMS

(75) Inventors: Timothy Bernard William Kroese, Brussels (BE); Kenneth Ruehl, Cincinnati, OH (US); Rachid Ben Moussa, La Hulpe (BE)

(73) Assignee: The Procter & Gamble Company, Cincinnati, OH (US)

( * ) Notice: Subject to any disclaimer, the term of this patent is extended or adjusted under 35 U.S.C. 154(b) by 723 days.

(21) Appl. No.: 10/631,400

(22) Filed: Jul. 31, 2003

(65) Prior Publication Data

US 2005/0034432 A1    Feb. 17, 2005

Related U.S. Application Data

(63) Continuation of application No. PCT/US02/02964, filed on Jan. 31, 2002.

(60) Provisional application No. 60/265,462, filed on Jan. 31, 2001.

(51) Int. Cl.
*B65B 47/00* (2006.01)
*B65B 5/00* (2006.01)
(52) U.S. Cl. .......................... 53/453; 53/559
(58) Field of Classification Search ................ 53/559, 53/453, 266.1, 467, 289, 292
See application file for complete search history.

(56) References Cited

U.S. PATENT DOCUMENTS 3,218,776 A  * 11/1965  Cloud ........................ 53/453
3,808,772 A     5/1974  Turtschan
4,017,247 A     4/1977  Soukup et al.
4,064,676 A  * 12/1977  King et al. .................. 53/77
2001/0053754 A1  12/2001  Hewitt et al.

FOREIGN PATENT DOCUMENTS

EP      0 188 832 A     7/1986
WO      WO 92/17382 A   10/1992
WO      WO 93/08095 A   4/1993

* cited by examiner

*Primary Examiner*—Rinaldi I. Rada
*Assistant Examiner*—John Paradiso
(74) *Attorney, Agent, or Firm*—Idris N. McKelvey; Laura R. Grunzinger

(57) ABSTRACT

A process for forming filled sealed pouches, comprising: supplying a thermoformable film to an upper surface of a conveyer which includes a plurality of recessed vacuum molds in its upper surface and is mounted to slide over an elongated conveyor support through holding, forming, filling and sealing stations; holding the film on the conveyer at the holding station; forming the film to form pouches at the forming station by supplying a forming under-pressure at the forming station into the mold recesses wherein the forming under-pressure is supplied through vacuum apertures leading from a vacuum supply apparatus and discharging through the conveyer support through vacuum orifices extending through the conveyer into the vacuum molds wherein under-pressure is supplied to the mold recesses at one or more subsequent processing stations through the vacuum apertures and vacuum orifices, and wherein the under pressure at the forming station is greater than the under-pressure at one or more of the subsequent processing stations; filling the pouches at the filling station; and sealing the pouches with a sealing film at the sealing station.

11 Claims, 1 Drawing Sheet

METHOD AND APPARATUS FOR FORMING FILMS

CROSS-REFERENCE

This is a continuation of International Application PCT/US02/02964, with an international filing date of Jan. 31, 2002, which claims benefit of Provisional Application Ser. No. 60/265,462, filed Jan. 31, 2001.

TECHNICAL FIELD

This invention relates to method and apparatus for forming a film and, in particular, to such method and apparatus wherein the film is thermoformed into pouches which are then filled and sealed in a sequential operation.

BACKGROUND TO THE INVENTION

Methods of forming a film are well known. An early disclosure is in U.S. Pat. No. 3,218,776. In that method the film is thermoformed into pouches and filled while travelling in a circular path. One disadvantage with present systems is that it is difficult to operate them at production speeds as high as would be desirable while maintaining product quality. Another problem is that it is desirable, for cost and functional reasons, to use a film which is as thin as possible but decreasing the thickness of the film increases the risk that the film will be undesirably weakened, and possibly even perforated, at some points in the final product, especially during high speed, high under-pressure, production conditions. Another problem is that it is necessary to apply a large vacuum (high under-pressure) and it can be difficult to provide such a pressure efficiently in the moulds in a manner which does not interfere with the overall operation of the process.

The object behind the invention is to solve these problems individually and, preferably, in combination.

SUMMARY OF THE INVENTION

The apparatus according to the invention is for forming filled pouches and it comprises:

(a) a vacuum supply apparatus,
(b) an elongated conveyor support,
(c) an elongated row of vacuum apertures leading from the vacuum supply apparatus and discharging through the conveyor support,
(d) a sequence of processing stations above the row of apertures in the conveyor support and which comprise holding, forming, filling and sealing stations,
(e) a conveyor which includes a plurality of recessed vacuum moulds in its upper surface and mounted to slide over the conveyor support through each the processing station,
(f) vacuum orifices extending through the conveyor into the vacuum moulds for transferring under-pressure from the vacuum apertures to each of the moulds,
(g) means for supplying formable sheet material on to the conveyor at or ahead of the holding station,
(h) drive means for driving the conveyor carrying the sheet material through the processing stations, and
(i) means for supplying into the mould recesses through the vacuum apertures and the vacuum orifices a forming under-pressure at the forming station and at one or more subsequent processing stations wherein the under pressure at the forming station is greater than the under-pressure at one or more (and preferably all) of the subsequent processing stations.

This apparatus solves the problems summarized above.

DETAILED DESCRIPTION OF THE INVENTION

Figure 1:
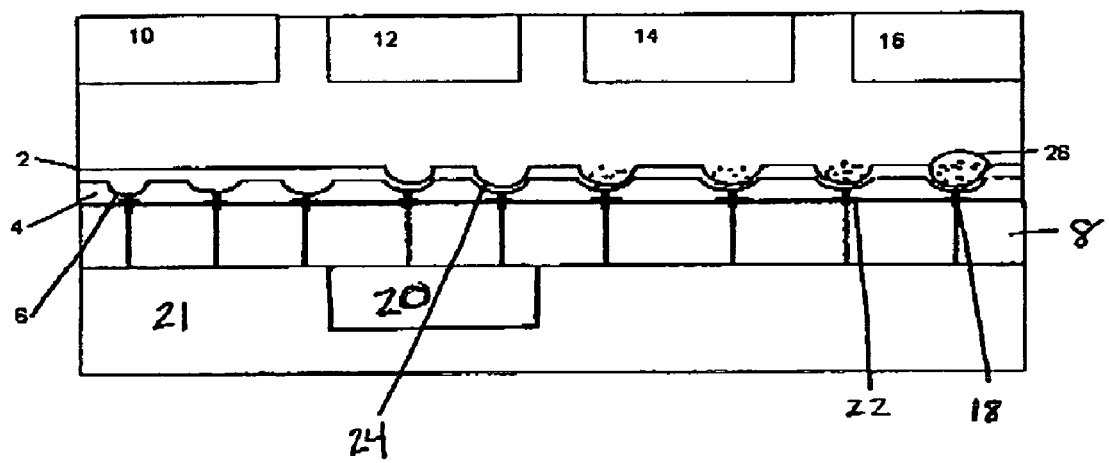
FIG. 1 schematically illustrates an embodiment of a process for forming filled sealed pouches.

FIG. 1 schematically illustrates an embodiment of the process according to the invention. The process comprises: a. supplying a thermoformable film 2 to an upper surface of a conveyer 4 which includes a plurality of recessed vacuum moulds 6 in its upper surface and is mounted to slide over an elongated conveyor support 8 through a holding stating 10, a forming stating 12, a filling station 14 and a sealing station 16; b. holding the film 2 on the conveyer 4 at the holding station 10; c. forming the film 2 to form pouches 24 at the forming station 12 by supplying a forming under-pressure at the forming station 12 into the vacuum moulds 6, wherein the forming under-pressure is supplied through vacuum apertures 18 leading from a vacuum supply apparatus 20 and discharging through the conveyer support 8 through vacuum orifices 22 extending through the conveyer 4 into the vacuum moulds 6, wherein under-pressure is supplied to the vacuum moulds 6 at one or more subsequent processing stations through the vacuum apertures 18 and vacuum orifices 22, and wherein the under pressure at the forming station 12 is greater than the under-pressure at one or more of the subsequent processing stations; d. filling the pouches 24 at the filling station 14; and e. sealing the pouches 24 with a scaling film 26 at the sealing station 16. An under-pressure greater than substantially zero is supplied at all of the subsequent processing stations.

The various processing stations may merge with each other but there may be an equilibrating station between any pair of adjacent stations wherein the under-pressure in the equilibrating station which merges with an adjacent processing station is at least the under-pressure in the adjacent station which has the lower under-pressure and is normally above the holding under-pressure. Additionally there may be stations at which no under-pressure is applied.

There may be a cutting station after the sealing station for cutting the sheet of pouches into individual pouches, or into groups of individual pouches, whilst still on the conveyor.

The apparatus may include means for heating the film in, or more usually as it approaches, the forming station. This process is known as thermoforming and is the preferred method of forming the film herein.

The conveyor support can be cylindrical but preferably is a flat support over most or (preferably) all of the processing stations. The conveyor should be such that the vacuum moulds slide over the conveyor in a manner that is substantially vacuum tight, so as to prevent undesirable loss of vacuum.

It is generally necessary to grip the edges of the film at the holding and forming stations to prevent the edges being drawn inwardly. This can be by mechanical grips or resilient bands, as is conventional, or by other means.

It is desirable in the invention to achieve the forming under-pressure gradually or stepwise and to release it gradually or stepwise. This reduces the risk of damage to the film and minimises the risk of crinkles in the film, even when the film is thin.

In particular, it is desirable to apply an under-pressure to some or all of the processing stations to a value which is considerably smaller than the high forming under-pressure. Designing the vacuum apertures in such a way as to achieve this while using a single vacuum supply apparatus tends to be rather inefficient and so preferably the vacuum apertures which lead to the holding station and/or to one or more of the subsequent processing stations lead from a first vacuum apparatus and the vacuum apertures which lead to the forming station lead from a second vacuum apparatus, wherein the first vacuum apparatus is a higher volume, lower under-pressure, apparatus for applying a lower under-pressure and the second apparatus is a lower volume, higher under-pressure, apparatus for applying the forming under-pressure at the forming station. As an example the first vacuum apparatus can be a simple vacuum pump, or even a fan, or other apparatus designed, for instance, to remove most of the air fast from the holding station at a large air flow but under a low under-pressure, and the second vacuum apparatus can be a vacuum chamber constructed to give a high forming under-pressure, but with only relatively small amounts of air being removed. The first vacuum apparatus may be used to supply vacuum to some (or all) of the subsequent processing stations and/or the second vacuum apparatus may be used for this purpose, depending upon the under-pressure required at each station. The under-pressure in the holding station can be substantially zero, by which we mean it is just sufficient to hold the film down against curling, but preferably it is greater than this.

It is desirable that the under-pressure does not increase too rapidly from the holding under-pressure up to the forming under-pressure, since this is liable to promote wrinkling or undesirable local damage to the film. Preferably therefore the overall vacuum supply apparatus (generally the second vacuum supply apparatus) and the vacuum apertures are so constructed that the under pressure in the moulds increases gradually or stepwise from the lower under-pressure (in the holding station) to the higher, forming under-pressure. The increase may be gradual over a duration which can be, for instance, 0.5 to 5 times, often 1 to 3 times, the duration for which the forming under-pressure is applied.

Generally there is a shaping station between the holding and forming stations. The vacuum supply apparatus and the vacuum apertures preferably are so constructed that the under-pressure applied to the moulds in the shaping station is at a value intermediate the lower under-pressure applied in the holding station and the higher forming under-pressure applied in the forming station. If desired, the shaping station may include a sequence of two or more stations with a higher under-pressure in each station than in the preceding station. The high forming under-pressure is preferably applied only for the time necessary to achieve forming and so preferably the vacuum supply apparatus and the vacuum apertures are so constructed that a lower under-pressure is applied to the moulds in, usually, all the subsequent processing stations (including any equilibrating stations) prior to and subsequent to the forming station. This under-pressure can be as low as the under-pressure applied in the holding station, but is usually higher than this.

The ability to apply a lower under-pressure after the forming station means that the vacuum pumps can have lower power consumption, there is less friction between sliding and fixed parts, less power is needed to move the conveyor and there is less risk of damage to the pouches and, consequently, less risk of leakage from the pouches.

The high forming under-pressure is generally applied less than 30%, and preferably less than 25%, and generally less than 20%, of the total time during which vacuum is applied to the moulds while travelling on the conveyor support. Usually the duration is at least 3%, and often at least 5 to 8% of the total time. Preferably it is around 10 to 15% of the total time.

The highest under-pressure which is applied to the moulds at stations other than the forming station is usually less than 80%, and preferably less than 70% (e.g., 40 to 70%) of the forming under-pressure. For instance, if the forming under-pressure is −500 mbar, the highest under-pressure at other stations is preferably −400 mbar and most preferably −350 mbar, or less. The under-pressure applied at the holding station is generally from 5 to 30%, often around 10 to 25%, of the forming under-pressure.

Typically the forming under-pressure is in the range −300 to −900 mbar, often around −400 to −700 mbar, the under-pressure in the holding station is −40 to −150 mbar and the under-pressure in the shaping station (if present) and in the filling and sealing stations is from −100 to −500 mbar, often around −200 to −400 mbar.

The elongated row of vacuum apertures may be one or more elongated slots which extend the length of the conveyor support but which are divided transversely to allow differing under-pressure to be applied to differing stations. Generally, however, the open area of the apertures is greatest where the under-pressure is to be greatest and least where the under-pressure is to be least. The open area can be selected either by varying the number of apertures or by varying the diameter of the apertures, or both.

The conveyor preferably comprises a continuous belt and a mould assembly wherein the belt makes substantially vacuum-tight sliding contact with the support and the mould assembly is secured for movement with the belt, and wherein there are passages through the belt for transmitting under-pressure from the vacuum apertures to the moulds. Thus, as the belt moves over the conveyor support, it maintains a vacuum-tight seal between the support and the belt but carries the mould assembly in sequence from one processing station to the next and allows the selected under-pressure to be applied through the belt to the moulds in each processing station. This arrangement allows for simple design and construction for the provision of variable under-pressure to the different stations.

The mould assembly preferably comprises a series of platens which are mounted on the belt, and mould plates which contain the vacuum moulds in their upper surface and which are mounted in the platens with the mould plates in vacuum contact through the platens and the continuous belt with the vacuum apertures in the conveyor support. Thus the belt not only seals between the belt and the conveyor support but also seals against adjacent platens and mould plates.

Since only a relatively short part of the travel of the belt is subjected to the highest under-pressure, the drag between the belt and the conveyor support (due to the under-pressure) is minimised.

The apparatus may be constructed to operate with stepwise motion, whereby the pouches move into a station, are treated appropriately in that station while stationary, and then move to the next station, with the duration in each station preferably as indicated above. However the invention is of particular value when the apparatus includes means for driving the conveyor, carrying the mould plates, and thus the pouches, continuously through the processing stations.

The film which is to be formed may be any suitable polymeric film. Preferably the film is thermoformable. The film can for example be obtained by casting, blow-molding, extrusion or blow extrusion. The polymer preferably has a weight average molecular weight of from about 1000 to 1,000,000, or even from 10,000 to 300,000 or even from 15,000 to 200,000 or even from 20,000 to 150,000. Preferred polymer copolymers or derivatives thereof are selected from polyvinyl alcohols, polyvinyl pyrrolidone, polyalkylene oxides, (modified) cellulose, (modified) cellulose-ethers or -esters or -amides, polycarboxylic acids and salts including polyacrylates, copolymers of maleic/acrylic acids, polyaminoacids or peptides, polyamides including polyacrylamide, polysaccharides including starch and gelatine, natural gums such as xanthum and carragum. Preferably, the polymer is selected from polyacrylates and acrylate copolymers, including polymethacrylates, methylcellulose, sodium carboxymethyl-cellulose, dextran, maltodextrin, ethylcellulose, hydroxyethyl cellulose, hydroxypropyl methylcellulose; most preferably polyvinyl alcohols, polyvinyl alcohol copolymers and/or hydroxypropyl methyl cellulose (HPMC).

Most preferred are materials which are water-soluble stretchable and elastic material comprising PVA polymer having properties such as for example, available from Nordenia, Aquafilm, Kuraray, Chris-Craft Industrial Products. Typically it has a thickness of from 10 to 100 μm.

The size of the pouches is typically from 5 to 200 mls, often having an upper surface area of 1 to 100 cm$^2$ and a depth of from 1 to 100 mm. The pouches can consist of a single chamber or of multiple chambers.

The pouches are sealed by bonding another film across the top of the sheet of pouches while it is still supported on the conveyor, the bonding either being by adhesive, solubilisation of the surface of the pouch film or the sealing film or both, or by thermal adhesion or by a combination. Preferably the bonding is by a combination of solvent welding and thermal adhesion.

The filling for the pouches may be solid or liquid and may be a gel. Preferably the pouches are to dissolve when added to water, in which event the sealing film or the pouch film, and preferably both films, dissolve or disintegrate in water. The filling for the pouches may be, for instance, a laundry detergent, dishwashing composition, fabric softener composition, bleaching composition or beauty care composition.

DESCRIPTION OF THE PREFERRED EMBODIMENT

A preferred apparatus herein comprises a vacuum supply apparatus the top of which is defined by a conveyor support through which a plurality of vacuum apertures extend from a vacuum box to which suction can be applied by a pump. There are smooth low friction strips extending along the sides of the support. These strips can be made of polyurethane or other suitable low friction material. They are firmly secured to the support. A belt (preferably made from smooth impermeable material such as steel) slides over the strips making a substantially vacuum-tight seal with them. The belt has apertures extending through it, and these may be arranged in the same pattern as the aforementioned vacuum apertures or in any other suitable pattern whereby vacuum can be applied from the vacuum apertures through the belt. The present apparatus includes a platen plate that has a base and side rails, the base having apertures corresponding to the apertures in the steel plate. Chains are driven by a drive mechanism and pins transmit the drive between the chains and the side rails of the platen plate. The belt is driven by a wheel on the same drive mechanism. The belt and the chains are inextensible, whereby the belt and the platens move with one another and have intermeshing faces which are sufficiently smooth that they are in substantially vacuum-tight inter-engagement. Thus, rotation of the mechanism causes the belt to move in a vacuum-tight manner over the support and causes the platens to move in a vacuum-tight manner with the belt. The individual platens are separated from one another and are positioned on the belt such that there is no aperture extending through the belt at positions between the platens. Each platen has an inwardly inclined side rail on each side. A mould plate having correspondingly shaped edges is slidably fixed between these inwardly inclined side rails. A vacuum chamber is defined between the upper surface of the platen and the lower surface of the mould plate. There are mould recesses in the upper surface of the mould plate and vacuum orifices leading into the base of the mould recesses, to transmit vacuum from the vacuum chamber which, in turn, is provided with an appropriate under-pressure by vacuum applied through the vacuum passages. The apparatus works by feeding a sheet of formable film material continuously from roll down on to the upper surface of the mould plate and the side rails of the platens, and is secured along the edges by appropriate side grips, for instance in conventional manner. The film is then carried on the mould plate to the holding station at which the film is initially held tight across the upper surface of the moulds and then these moulds are evacuated to provide an under-pressure of, for instance, −100 mbar, with only some stretching of the film down into the individual moulds. For this purpose, large central vacuum apertures and the smaller side vacuum apertures lead to a dedicated chamber and through a duct into an evacuating pump designed predominantly to remove large amounts of air rapidly. As the moulds move along the conveyor they are subjected to a higher under-pressure, for instance −300 mbar, as they reach the shaping station in which the film is deformed into approximate, but not total, conformity with the inner shape of the mould. As the film travels from the holding station to the shaping station it is heated by heaters to the thermoforming temperature. For instance, depending upon the film, the film may be heated to a temperature of 50° C. to 180° C. The film then reaches the forming station and it is at this station that the maximum under pressure is applied to the moulds, typically −400 mbar. At this stage total conformation of the film to the mould surface is achieved. A lower under-pressure is applied to the film in the moulds at all subsequent positions. Typically, the formed pouches are allowed to cool, and the pressure is maintained here at a value less than the thermoforming under-pressure, typically −300 mbar. After the cooling stage, the film may move through a filling station where it is filled in conventional manner with product such as liquid detergent. The film and pouches then travel through a sealing station where a second layer of film is brought down on to the film around the pouches and is pressed against it by suitable pressing means under conditions whereby the upper layer seals to the parts of the film extending over the upper surface of the mould plate. The assembly can then pass through a cutting station where the pouches are cut from one another by conventional means. Typically the duration of the travel through the holding station is 0.5 to 5 seconds, often around 2 seconds, and the duration in each of the shaping and forming is from 0.2 to 3 seconds. The pouches can then be tipped out of the moulds and collected or packed. The conveyor support can be provided with a combination of large vacuum apertures and smaller vacuum apertures through the area extending from the holding station and the forming station, and then only with the smaller vacuum apertures in the subsequent areas. One vacuum apparatus can provide the vacuum for each of the stations where a vacuum is required. By this means it is possible to optimise the under-pressure to each processing station and to control the process generally, minimising the drag between the stationary conveyor support and the sliding conveyor.

What is claimed is:

1. A process for forming filled sealed pouches, comprising:
   a. supplying a thermoformable film to an upper surface of a conveyer which includes a plurality of recessed vacuum moulds in its upper surface and is mounted to slide over an elongated conveyor support through holding, forming, filling and sealing stations;
   b. holding the film on the conveyer at the holding station;
   c. forming the film to form pouches at the forming station by supplying a forming under-pressure at the forming station into the vacuum moulds, wherein the forming under-pressure is supplied through vacuum apertures leading from a vacuum supply apparatus and discharging through the conveyer support through vacuum orifices extending through the conveyer into the vacuum moulds, wherein under-pressure is supplied to the vacuum moulds at one or more subsequent processing stations through the vacuum apertures and vacuum orifices, and wherein the under pressure at the forming station is greater than the under-pressure at one or more of the subsequent processing stations;
   d. filling the pouches at the filling station; and
   e. sealing the pouches with a sealing film at the sealing station;
   wherein an under-pressure that is greater than substantially zero is supplied at all of the subsequent processing stations.

2. The process of claim 1, wherein the under pressure at the forming station is greater than the under-pressure at all of the subsequent processing stations.

3. The process of claim 1, wherein the vacuum apertures which lead to the holding station and/or one or more of the subsequent processing stations, lead from a first vacuum apparatus and the vacuum apertures which lead to the thermoforming station lead from a second vacuum apparatus, wherein the first vacuum apparatus provides a lower under-pressure than the second vacuum apparatus.

4. The process of claim 1, wherein the under-pressure in the moulds increases gradually or stepwise from a lower under-pressure or a substantially zero under pressure in the holding station to the higher, forming under-pressure.

5. The process of claim 4, further comprising shaping the film at a shaping station, wherein the shaping station is between the holding station and the forming station and wherein the under-pressure applied to the moulds in the shaping station is at a value intermediate the lower or substantially zero under-pressure applied in the holding station and the higher forming under-pressure applied in the forming station.

6. The process of claim 1, wherein a lower under pressure is applied to the moulds in all the stations before and subsequent to the forming station than in the forming station.

7. The process of claim 1, wherein the film is thermoformed at the forming station.

8. The process of claim 1, wherein the film is heated in or prior to approaching the forming station.

9. The process of claim 1, wherein the conveyer comprises a continuous belt which makes substantially vacuum-tight sliding contact with the elongated conveyer support and a mould assembly comprising the vacuum moulds and secured for movement with the belt and wherein there are passages through the belt for transmitting under-pressure from the vacuum apertures to the vacuum moulds.

10. The process of claim 1, wherein a series of platens comprise at least one mould, said platens being mounted on the belt and a mould in each platen being in vacuum contact through its associated platen and the continuous belt with the vacuum apertures in the conveyer support.

11. The process of claim 10, wherein the platens comprise a plurality of moulds.

* * * * *